Patented Mar. 16, 1937

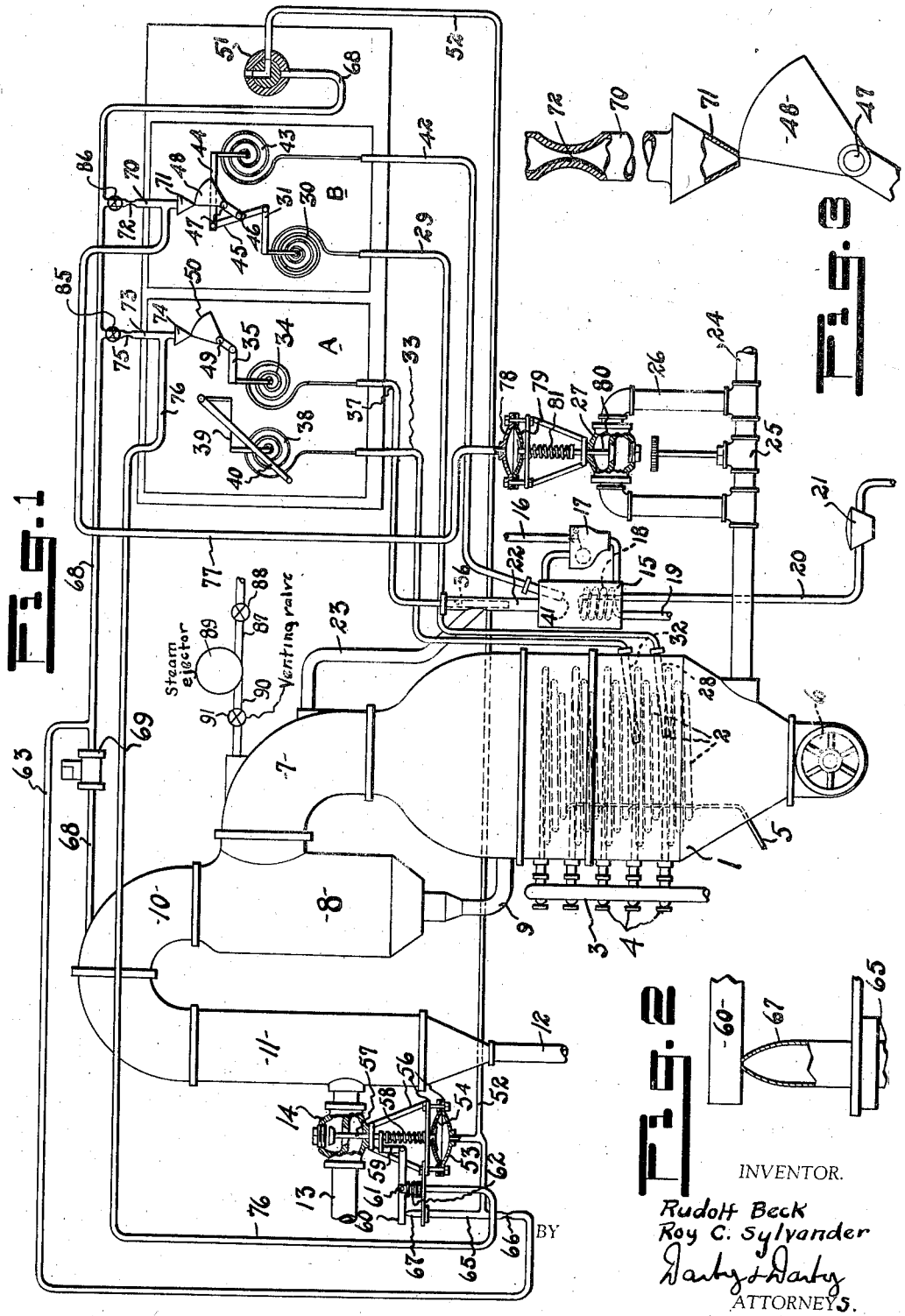

2,073,825

UNITED STATES PATENT OFFICE 2,073,825

AUTOMATIC TEMPERATURE AND PRESSURE CONTROL SYSTEM

Rudolf Beck, Bridgeport, and Roy C. Sylvander, Fairfield, Conn., assignors to Consolidated Ashcroft Hancock Company, Inc., Bridgeport, Conn., a corporation of Delaware Application September 5, 1934, Serial No. 742,720

7 Claims. (Cl. 159—44)

This invention relates to improvements in apparatus by means of which temperature and pressure conditions within heat exchange apparatus may be in part automatically and predeterminedly controlled in accordance with desired conditions.

More specifically, the system is directly concerned with apparatus by means of which the sugar boiling process may be automatically controlled.

An important object of this invention is to provide a control system for a vacuum pan operated in conjunction with a barometric condenser, by means of which both the temperature and the pressure conditions within the vacuum pan may be controlled in a sugar boiling process, for example.

These and many other objects as will appear from the following disclosure are secured by means of the invention described in the following specification in conjunction with the attached drawing and pointed out in the appended claims.

This invention resides substantially in the combination, construction, arrangement and relative location of parts as described below.

In the drawing:—

Figure 1 is an elevational view with some parts broken away and some parts shown diagrammatically of a system in accordance with this invention;

Figure 2 is an enlarged detail view partly broken away and partly in section; and Figure 3 is likewise an enlarged detail view with some parts broken away and some parts shown in section.

The apparatus of the system will first be described in detail in order that its operation and particularly in connection with the sugar boiling process may be more readily understood. It may be noted here that although the system is particularly adapted for the heat treatment of sugar syrup it will be readily apparent to those skilled in the art that it may be easily adapted for the automatic control of temperature and pressure conditions in various forms of heat exchange apparatus employed for many purposes.

As illustrated in the drawing, the system is used in conjunction with a vacuum pan 1. The vacuum pan may, of course, be any one of a number of well known forms and types. Within the vacuum pan are a plurality of heating coils 2 arranged in any suitable way so that the contents of the vacuum pan may be heated thereby. These heating coils are arranged in groups which are supplied with a heating medium such as steam from a main supply header 3. The individual heating coils may be independently controlled by means of the valves 4. All of the heating coils are shown with a common return pipe 5 for the heating medium. The vacuum pan is provided with the usual discharge valve 6 at the bottom thereof and connected at the top by means of a large pipe 7 to a mechanical separator 8 of any suitable and known form of construction. The separator in turn is connected by a gooseneck pipe 10 to a barometric condenser 11 which may likewise be any one of a number of known types and forms. At 12 is the discharge pipe through which the cooling water from the barometric condenser passes. The cooling water is supplied to this condenser through a large pipe main 13 and a control valve 14. The invention is not limited to a barometric condenser but may be used with other types of condenser.

At 15 is shown a small closed container which is termed a pilot pan. Water is supplied to the pilot pan through pipe 16, float valve 17 and the connection at the bottom thereof to the bottom of the pilot pan. A pressure equalizing connection from the top of the pilot pan to the float valve 17 is used so that by this arrangement, as will be readily apparent, the water level in the pilot pan will remain substantially constant by reason of the float valve which is employed, as diagrammatically illustrated, to cut off the water supply and maintain a definite level of water in the pilot pan.

Mounted in the pilot pan is a small heating coil 18 which may be supplied with steam or other heating medium through the supply connection 19. The pipe 20 and steam trap 21 provide a return to waste for the heating medium. The pilot pan is provided with a vertically extending pipe or tube 22 which is in turn connected by means of a branch pipe 23 to the pipe 7 at the top of the vacuum pan. By means of the pipe 23 the same vacuum pressure condition is maintained in the pilot pan as obtains in the vacuum pan.

At 24 is the supply pipe through which the sugar syrup or other substance to be treated in the vacuum pan is supplied thereto. This pipe 24 is provided with a main manually controlled gate valve 25. A pipe shunt 26 is connected around the valve 25 and has included therein a control valve 27. Thus when valve 25 is closed the material supplied through pipe 24 must pass around through the shunt and be controlled by valve 27. When valve 25 is open the material passes directly through pipe 24 without going around through the shunt.

A vacuum is created and maintained in the vacuum and pilot pans by means of a steam ejector 89. Steam is supplied to the ejector by pipe 87 and controlled by valve 88. The pipe 90 connects the ejector with pipe 7 and is provided with a venting valve to open the vacuum pan to the atmosphere when desired to break the vacuum therein.

At 28 is a thermostatic bulb which is connected by a pipe 29 to a Bourdon spring 30 or other suitable pressure responsive device. This spring has connected to the free end thereof a rigid lever 31. At 32 is another thermostatic bulb connected by pipe 33 to a Bourdon spring 38 or other suitable pressure responsive device. The free end of this spring is connected to a pivotally supported pen arm 40 by mans of the diagrammatically illustrated linkage system 39. Both of the thermostatic bulbs 28 and 32 form with their connecting pipes and associated Bourdon springs closed systems containing liquids and/or gases in accordance with well known practice in this art. The tube 22 is closed at its upper end and open to the interior of the pilot pan and has mounted therein another thermostatic bulb 36 which is connected by pipe 37 to a Bourdon spring 34. The free end of this spring is connected to a lever 35. At 41 is still another thermostatic bulb mounted in the pilot pan so as to be submerged in the steam therein. This bulb is connected by pipe 42 to a Bourdon spring 43. The free end of this spring is connected to a rigid lever 44. The free ends of levers 31 and 44 are pivotally connected to the ends of a link 45, which in turn is pivotally connected at 46 to an extension on the movable valve member 48 which is pivotally mounted on a fixed pivot point 47.

It is to be noted that the pivot point 46 is a floating pivot point and moves about in a manner which is a resultant of the differential movements applied thereto by the levers 31 and 44. Another movable valve member 50 is pivotally supported at 49 and pivotally connected to the lever 35. The two instruments thus described and represented generally by the reference numerals A and B represent forms of well known automatically operated temperature recording and controlling devices. The arrangement illustrated by the reference numeral B is a differential type of temperature controller and the controller A is preferably of the type disclosed in the co-pending Beck application Serial No. 718,476, filed March 31, 1934.

Both instruments in addition to keeping a continuous temperature record also actuate air operated controlling systems which will shortly be described. The pen arm 40 keeps a continuous record of the temperature condition of the material in the vacuum tank. The valve member 50 controls the motor which operates the flow of cold water to condenser 11 through valve 14. Valve member 48 controls the motor which operates valve 27, which in turn controls the flow of fresh syrup to the vacuum pan. This valve member is sensitive to the differential temperature conditions existing between the temperature of boiling water in the pilot pan and the temperature of the material in the vacuum pan, as will appear in more detail later. The Bourdon springs 30 and 43 which control the valve member 48 may likewise, as stated above, control a recording pen arm in accordance with well known practice to give a continuous record of the differential temperature condition above mentioned.

The controller A through the agency of the vacuum within the vacuum pan is interconnected with the cold water valve 14 and is responsible for the operation thereof. A pipe 68 connects the gooseneck 10 with a check valve 69 connected so that if steam pressure is present in the vacuum pan or any pressure which goes above atmospheric pressure occurs in the pan the valve will close, thereby isolating the controllers from the vacuum pan. The other side of check valve 69 is connected by pipe 68 to a manually controlled valve 51 to be later described. Pipe 68 is provided with a branch 73 terminating in a nozzle 74 having a small discharge orifice in close proximity to the path of travel of the outer edge of the valve member 50. Branch 73 is provided with a manual valve 85 for closing this pipe off from pipe 68. The branch 73 also includes a restriction forming an orifice or venturi 75. The area of the orifice 75 is less than the area of the discharge port of nozzle 74. Branch pipe 73 is also connected by a pipe 76 to an expansible member or sylphon 62 which is rigidly supported at one end upon an arm extending from the supporting framework 56 mounted on valve 14. The valve stem 57 of valve 14 is connected to a flexible diaphragm 54 which in conjunction with the metal cap or dome 53 forms a hermetically sealed chamber. A spring 58 surrounds the valve stem and is seated at one end against a fixed part of the framework 56 and at the other end against a collar locked to the valve stem. Pivotally mounted at 61 on the free end of the sylphon is a lever 60. One end of this lever is pivotally connected by an arm 59 which in turn is rigidly secured to the valve stem 57. Supported adjacent the sylphon 62 is a nozzle 67 which has a small discharge port in a position to be closed by the arm 60. A pipe 63 connects the pipe 68 with the nozzle 67 and has therein a small orifice or venturi 66 of an area less than the area of the discharge port of the nozzle 67. This piping system in connection with the controller A provides the mechanism for controlling the operation of valve 14 and hence the supply of cold water to the condenser 11.

Controller B with its connections controls the operation of valve 27. The pipe 68 is connected by a branch 70 to a nozzle 71 having a discharge port in close proximity to the path of movement of the end edge of the valve member 48. This branch includes a shut-off valve 86 and an orifice 72. The area of orifice 72 is less than the area of the discharge port of the nozzle. As shown, branch 70 is connected by pipe 85 to the chamber of the motor which operates valve 27. This chamber is formed by a dome or cover plate 78 hermetically sealed to a flexible diaphragm 79 and supported upon the valve 27 by means of the framework. The valve stem 80 of this valve is connected to the flexible diaphragm 79 and is encircled by a spring 81 which seats on the framework and on a collar locked to the valve stem. The spring 81 normally tends to close valve 27, as distinguished from spring 58 which normally tends to open valve 14.

The manual control valve 51 is also connected by pipe 52 to the chamber of the motor which operates valve 14 and also to the portion 65 of pipe 63. This manual control valve has three operative positions. As illustrated in the drawing, it is shown in "open" position. In "closed" position it directly connects pipes 52 and 68. In "automatic" position it is set so that both pipes 52 and 68 are sealed off, or, in other words, neither is connected to the atmosphere nor are they connected together.

Before describing the operation of this apparatus, some discussion of one process which may be carried out with it is desirable. The process selected is that employed in boiling sugar syrup or massecuite for the purpose of removing the sugar therefrom in the form of grains or crystals. Sugar boiling is the art of concentrating juices and syrups in a vacuum to the point of crystallization where uniform sugar crystals of predetermined size will be obtained. Proper sized sugar crystals are produced in the boiling process by splitting the boiling operation into two periods, viz., grain formation and grain growth. After the syrup has been boiled for the proper period of time the temperature to which it is subjected is suddenly lowered to cause the formation of the grain nuclei. These grain nuclei are then grown to sugar grains of the proper size, which is accomplished during the second period.

An important requirement of the process when it is properly carried out is that of preventing any further grain formation after the grain forming period, since obviously the final sugar crystals will be of various sizes if they are started at different periods and subjected to different periods of growth.

When sugar is dissolved in water the boiling point of the solution is higher than the boiling point of pure water under a given absolute pressure. The elevation of the boiling point of the solution is, of course, greater the greater the concentration of the solution. It is a well known fact that a sugar solution may exist in a super-saturated condition. As soon as the solution is super-saturated there is, of course, a tendency for crystals to form. Since, however, time is required for the formation of these crystals, the crystallizing pressure may build up somewhat with the super-saturation of the solution before crystals form. At a slightly lower degree of super-saturation and at a definite boiling point elevation, sugar will continue to go out of solution onto the crystals already formed, but no new crystals will form if the temperature and pressure conditions are maintained constant.

The present practice in sugar crystal formation is carried out manually and represents a highly skilled procedure requiring years of experience and hard won judgment in carrying it out efficiently. In the manual operation a desired amount of syrup is drawn into the vacuum pan and is heated to evaporate the moisture therefrom to produce a saturated sugar solution at a desired temperature as determined by the absolute pressure in the vacuum pan. The pressure at which boiling occurs is regulated by the injection of water into the barometric condenser connected to the vacuum pan. This is done manually. At a certain concentration the syrup in the pan is saturated with sugar. This condition is determined by the operator by visual examination of a sample withdrawn by means of a proof-stick and placed upon a glass plate. Due to the cooling of the sample upon withdrawal, sugar crystals form on the glass plate and the operator knows that the mass in the pan is ready for the formation of grain. At this stage of the process the temperature of the boiling syrup is suddenly lowered by increasing the injection of cold water into the condenser and thereby reducing the pressure or increasing the vacuum in the vacuum pan. The sudden lowering of the temperature of the syrup in the vacuum pan causes it to be super-saturated and minute crystals immediately form. It then becomes necessary for the operator to stop the formation of new crystals as soon as the desired number of grains has been formed. This is left to a matter of judgment on the part of the operator who must determine when grain formation is to stop. It is stopped by increasing the absolute pressure in the vacuum pan or lowering the vacuum therein by reducing the amount of water supplied to the barometric condenser. This raises the temperature of the boiling syrup in the vacuum pan and reduces the super-saturation to a point at which no further crystals will be formed.

From then on the operation consists in building the minute grains or crystals to full size and in preventing the formation of any further grains thereafter. Grain growth is sustained by introducing fresh unconcentrated syrup into the vacuum pan from time to time by manually controlling the valve in the supply line. This again depends upon the skill and judgment of the operator. It is very important during this portion of the process not to introduce the fresh syrup so slowly as to permit the syrup in the pan to become too thick or so fast as to permit it to become too thin. If it becomes too thick, new grains will form, and if it becomes too thin the growth of the grains will be too slow.

It will be seen that all of the above at present is entirely dependent upon expert judgment and skill which is only won after many years of experience and is at best an experimental procedure.

It is hardly necessary to note that uniformity of grain size is a desirable commercial requirement, and, furthermore, that if there are mixed with the grains of proper size undesired smaller grains they will interfere with the later centrifuging operations at which time the crystals are dried. The presence of grains smaller than standard size results in a large loss since the smaller grains are lost in the centrifuging operation or clog up the screens.

A description will now be given of the manner in which the apparatus of this disclosure automatically carries out the above operations with the advantage that more uniform results are secured without the intervention of judgment and with considerable saving in the amount of steam and water required. Another advantage of the automatic process is that the grains are of more uniform size, additional grain formation is prevented, and hence the large losses during the centrifuging operations are eliminated. Furthermore, the process may be carried out in less time and with less trouble than is true with the manual process.

The operation of the apparatus will now be described in full detail. The steam ejector 89 is operating and creating a vacuum condition within the vacuum pan and the pilot pan. The steam injector can be any one of a number of known forms and acts when supplied with high pressure steam to create a vacuum in the pan. Valve 91, of course, is closed so that the pan is not vented to the atmosphere. At this time valves 85 and 86 are closed, cutting the controllers out of circuit. The manual valve 51 is in the "open" position as illustrated in the drawing. The chamber of the motor which operates valve 14, being open to atmosphere through pipe 52 and valve 51, is expanded, as shown in the drawing, and valve 14 is opened so that a full supply of cold water is passing through the barometric condenser. The manually operated by-pass valve 25 is opened with the result that the sugar syrup flows into the vacuum pan. As the first unit of the steam coils 2 is covered the lowermost valve 4 is opened, with the result that steam is supplied to that unit. The condensate and steam returns through the exhaust line 5. At the same time steam is turned into the heating coil 18 of the pilot pan through pipe 19. Water is, of course, present in the pilot pan to the proper level. As the sugar syrup rises to submerge the second unit of the heating coils the next valve 4 is open, supplying steam thereto. These operations are continued until the heating coils are covered. The by-pass valve 25 is then closed. The only reason for serially supplying the heating coil units with steam is found in the desire to start heating the body of syrup as quickly as possible.

If not already so set, the controller A is set at a definite low temperature point, preferably of the order of 125° F. The controller, when so set, will then maintain an absolute pressure condition in the vacuum pan corresponding thereto.

A low pressure insures the fastest possible boiling action which is necessary to properly concentrate the syrup. The vacuum supply is then turned on to both controllers A and B by opening valves 85 and 86. Likewise, valve 51 is set to "automatic" position, which is, as above stated, the position where both pipes 68 and 52 are sealed at the valve. The operation of cutting the controllers into circuit may be carried out while the vacuum pan is being filled with syrup.

The heating action now going on in the vacuum pan is effecting concentration of the syrup therein and its temperature is maintained at the setting point of controller A in the following manner. It might again be proper to here note that the pen arm 40 is making a continuous record of the temperature of the syrup so that any necessary adjustments of the apparatus may be made as the requirement therefor is indicated on the chart. If the temperature in the vacuum pan should tend to go below the set temperature the pressure therein will fall. The pressure will also fall in pipe 63 and hence in the chambers of the motors of valves 14 and 27 operating valve 14 towards closed position and valve 27 towards open position. Thus the system is direct acting to correct for changes in the vacuum pan pressure and the supersaturation of the liquid in the vacuum pan. The thermostatic portion of the control then operates to provide final correction for these changes. The dropping of the temperature will cause Bourdon spring 34 to move the valve member 50 into the path of nozzle 74, thus closing or partially closing its orifice. The result is that the pressure in pipe 76 and sylphon 62 will fall, causing lever 60 to close or partially close nozzle 67. The result is that the pressure will fall in pipe 63 and hence in the chamber of the motor which operates valve 14, causing it to close or move towards closed position, cutting down the supply of cold water to the condenser 11. The pressure and therefore the temperature in the vacuum pan will build up to the proper value. If the temperature in the vacuum pan should rise above the desired value a reverse operation will occur when the valve member 50 will further expose the port of nozzle 74, permitting the pressure in pipe 76 to rise, causing valve 14 to move to a more open position. The supply of cold water to the condenser increasing will reduce the pressure in the pilot pan and lower the temperature therein.

The utility of the restrictions 75 and 66 and their relatively smaller areas with respect to the nozzle areas here comes into play. When valve member 50 exposes the port of nozzle 74 the pressure in pipe 76 may build up even though a lower pressure is present in pipe 68. The reason for this is that the larger area of the nozzle 74 nullifies the effect of the smaller orifice 75. Thus even though some air will pass through the orifice 75 into pipe 68 sufficient air is entering nozzle 74 to permit the pressure in pipe 76 to build up as required. Likewise, as sylphon 62 moves lever 60 to open the port of nozzle 67 the pressure may build up in the chamber of the valve motor even though air is also being drawn into pipe 68 through pipe 63 and the restricted orifice 66. In other words, when the nozzles 74 and 67 are closed the presence of the orifices 75 and 66 will not interfere with the creation of the proper pressure conditions in the control pipe. Likewise, when these nozzles are open the presence of the orifices is beneficial in permitting the pressure to build up in the piping system through the nozzles.

The purpose of the sylphon will be referred to briefly, although its full function is disclosed in the above mentioned co-pending application. It will be noted that what the sylphon really does with changes in pressure therein is to shift the pivot point 61 of the lever 60, thus varying the effect of the movement of the valve stem upon the lever 60. Thus for any setting of the valve stem 57 the movement of the sylphon will shift the pivot point 61 of lever 60 and, of course, also the position of the lever with respect to nozzle 67. When the valve stem then moves it will in turn modify the position of lever 60 with regard to nozzle 67. The purposes of this arrangement may be found in the fact that with it it is possible to compensate the system for the inherent frictional forces present in the valve, eliminate the tendency of the device to "hunt", and render the control more sensitive to smaller pressure changes. For example, if the pressure rises in the vacuum pan the sylphon will move lever 60 away from nozzle 67 before valve 14 has undergone any movement as a result of that change in pressure. The movement of lever 60 opens nozzle 67 and pressure in the chamber of the valve motor will quickly build up so that valve 14 under that action and the action of its spring 58 will move further open. As it moves open it causes the left hand end of lever 60 to move nearer and nearer to the port of nozzle 67. Ultimately this lever will assume the proper position to cause valve 14 to stop at and maintain the proper setting which it will hold until the pressure in the vacuum pan begins to fall when the sylphon will begin to contract, causing lever 60 to further close nozzle 67. Broadly it may be stated that the sylphon arrangement increases the sensitivity of the system and its stability.

The apparatus is now operating under the control of the controller A as just described and the syrup in the vacuum pan gradually gets thicker and thicker. The controller B is not yet functioning since it has been set to maintain a temperature difference between the temperature of the boiling water and the temperature of the syrup which has not yet been attained because the syrup is not yet concentrated sufficiently. When, however, the syrup has concentrated to a point where its boiling point differential over the temperature of the boiling water has reached the predetermined value, as indicated on the chart of the controller B, the time has arrived for the "graining" operation.

To effect the formation of sugar grains, valve 51 is then moved to valve "open" position, which is the position shown in Figure 1. Pipe 52 is then connected directly to the atmosphere and valve 14 moves to full open position. At this time it is obvious that the controlling function of controller A is destroyed because the chamber of the motor valve is directly open to the atmosphere through pipe 52. The maximum amount of cold water is then passing through condenser 11 with the result that the pressure and the temperature in the vacuum pan rapidly fall. At this point and in accordance with known practice, it may be desirable to introduce powdered sugar into the vacuum pan which aids in the formation of the sugar grain nuclei. This can be accomplished, for example, by letting the vacuum within the pan suck the sugar thereinto from a small chamber. When the proper quantity of grains has been formed, as will be determined from an inspection of samples, manual valve 51 is turned to "closed" position when it connects pipes 52 and 68 together. This causes valve 14 to close with a snap action since the full vacuum in pipe 68 is applied through pipe 52 to the chamber of the motor of valve 14.

With the sudden closing of valve 3 the temperature of the massecuite (the mixture of syrup and sugar crystals) rises. This stops grain formation. The remaining heating operation then consists in the continued boiling of the massecuite at the proper temperature for the most rapid building up of solid firm sugar crystals without the formation at a later stage of any further grains. An important requisite of proper sugar grain formation is the prevention of the formation of any further sugar grains after the initial formation and throughout the period of the building up of the grains to full sized sugar crystals. The function of the controller B is to maintain the temperature of the boiling syrup at the proper value and to prevent it from deviating therefrom, particularly in the direction of a lower temperature, by the addition of fresh syrup through pipe 24.

The controller A is now set to a higher temperature which is preferably of the order of 150° F. so that this controller may, through its control of valve 14, act to maintain the proper pressure condition in the vacuum pan. Valve 51 is then set to "automatic" position, which is the position where both pipes 68 and 52 are sealed at the valve. For purposes of emphasis, it may here be noted that valve 51 is only set to "closed" position at the time indicated above to cause the valve 14 to snap closed at the end of the graining operation to effect a sudden rise in pressure and temperature in the vacuum pan.

The massecuite continues to boil and concentrate, with the result that its temperature tends to rise and at the same time the grains are building up. When the temperature rises to the point for which the controller B is set, its valve member 48 moves to close the port of nozzle 71. The pressure in pipe 77 then falls, reducing the pressure in the chamber of the motor of valve 27. Valve 27 then opens, permitting fresh syrup to pass from pipe 24 around through the shunt 26 and into the vacuum pan. This reduces the concentration of the massecuite and the temperature tends to fall, thereby again modifying the position of valve member 48 through the control of bulb 28 and Bourdon spring 30. It may be here noted, as previously stated, that the temperature and pressure conditions in the pilot pan, acting through bulb 41 and Bourdon spring 38, cause the positioning of the floating pivot point 46 to provide, so to speak, a relative or fixed standard against which the action of Bourdon spring 30 may operate to position valve member 48. It will be seen then how the controller B maintains the concentration of the massecuite in the vacuum pan so that the differential temperature of the massecuite with respect to the temperature of boiling water at the same pressure will remain at a substantially constant value. This value, of course, is the value at which the building up of the grains occurs most rapidly and economically. At the same time, of course, the controller A is positioning valve 14 to maintain the proper pressure in the vacuum pan.

These operations continue until the vacuum pan is substantially full. The vacuum supply to controller B is then cut off by closing valve 86. The cutting off of the controller B causes valve 27 to close and to close quickly by the sudden cutting off of the controller effected by the valve 86. Controller A, however, continues to function. The cold water supply to the condenser is now cut off by another valve in the water line 13, not shown, which may be an ordinary manual valve. The supply of steam to the steam coils and pilot pan is also cut off. The pressure in the vacuum pan is brought back to atmospheric pressure simply by opening the venting valve 91 so as to open pipe 90 to the atmosphere. The dumping valve 6 at the bottom of the vacuum pan is then opened and the massecuite charge therein is discharged. The major operations are now completed and the cycle may be repeated with a fresh supply of syrup.

However, the interior of the vacuum pan is first preferably cleaned by the direct admission of steam thereto which melts out all sugar particles adhering to the interior thereof. At this time the check valve 69 will be closed by the steam pressure in the vacuum pan so that no steam gets into the control system. After the vacuum pan is thoroughly cleaned valve 6 is again closed, valve 91 is moved to close off the vent, and the apparatus is ready to again go through the cycle.

It may be pointed out that in the particular system shown the vacuum or low pressure condition within the vacuum pan provides the pressure differential necessary to effect operation of the control system. It will likewise be clear to those skilled in the art that this system may be adapted for the control of a cooling apparatus as well as a heating apparatus. This merely involves reversal of the valves 14 and 27 so that for the same direction of movement they seat and unseat respectively. Likewise the valve members 48 and 50 need only be shifted to the extreme left position so that for the same pressure conditions in the Bourdon springs they will effect reverse movements.

From the above description, it will be apparent that this invention resides in certain principles of construction and operation which may be embodied in other physical forms without departure from the scope of the invention. We do not, therefore, desire to be strictly limited to the disclosure as given for purposes of illustration but rather to the scope of the appended claims.

What we seek to secure by United States Letters Patent is:

1. An apparatus as described comprising a vacuum pan, means in said pan for heating it, a condenser connected to said pan, a cold water supply connection to said condenser, a fluid pressure operated valve in said connection, a connection from said pan to the fluid pressure operated valve whereby said valve is directly operated by pressure changes in said pan to vary the amount of cold water delivered to said condenser, a closed water boiler in communication with said pan, means for boiling the water in said boiler, means subject to the temperature of the water in the boiler for controlling also the fluid pressure operated valve for maintaining the pressure in said pan at a desired value, and manually operated means for opening said connection to the fluid pressure operated valve to the atmosphere, whereby said valve is snapped to closed position.

2. In an apparatus as described the combination comprising a vacuum pan, heating means in said pan, a condenser connected to said pan, a cold water supply connection to said condenser, a valve in said connection, a fluid pressure operated motor connected to said valve, a pipe connection from said motor to said pan having a restriction and a port, a valve member for controlling the port, pressure responsive means connected to said valve member, a water boiler connected to said pan, means for heating water in the boiler, and temperature responsive means in the boiler for changing the pressure in the pressure responsive means to vary the position of the valve member with respect to the port, the fluid pressure motor and pressure responsive means being arranged so that a change in the pan pressure will cause the motor valve to move in the desired direction without or ahead of action from the temperature responsive means.

3. In an apparatus as described the combination comprising a vacuum pan, heating means in said pan, a condenser connected to said pan, a cold water supply connection to said condenser, a valve in said connection, a fluid pressure operated motor connected to said valve, a pipe connection from said motor to said pan having a restriction and a port, a valve member for controlling the port, pressure responsive means connected to said valve member, a water boiler connected to said pan, means for heating water in the boiler, and temperature responsive means in the boiler for changing the pressure in the pressure responsive means to vary the position of the valve member with respect to the port, the fluid pressure motor and pressure responsive means being arranged so that a change in the pan pressure will cause the motor valve to move in the desired direction without or ahead of action from the temperature responsive means, said valve being spring closed and operated in opening direction as the pressure increases in said motor.

4. In an apparatus as described the combination comprising a vacuum pan, heating means in said pan, a condenser connected to said pan, a cold water supply connection to said condenser, a valve in said connection, a fluid pressure operated motor connected to said valve arranged so as to open the valve on increasing pressure, a pipe connection from said motor to said pan having a restriction and a port, a valve member for controlling the port, pressure responsive means connected to said valve member, said valve member tending to open said port on increasing pressure, a water boiler connected to said pan, means for heating the water in the boiler, and temperature responsive means in the boiler for changing the pressure in the pressure responsive means.

5. In an apparatus as described the combination comprising a vacuum pan, heating means in said pan, a material supply connection to said pan, a valve in said connection, a fluid pressure operated motor connected to said valve, a pipe connection from said motor to said pan having a restriction and a port, pressure responsive means including a valve member operable past said port, and thermostatic means in the water boiler and in the pan connected to said pressure responsive means so that the port opening is varied in accordance with the temperature difference between the pan and the boiler, the fluid motor being arranged so that the valve will move in the proper direction in case of a change in pan pressure without or ahead of action by the temperature responsive means.

6. In an apparatus as described the combination comprising a vacuum pan, heating means in said pan, a condenser connected to said pan, a material supply connection to said pan, a valve in said connection, a fluid pressure operated motor connected to said valve in such a way as to close the valve on increasing pressure, a pipe connection from said motor to said pan having a restriction and a port, pressure responsive means for varying the port opening, a water boiler connected to said pan, and thermostatic means in the water boiler and in the pan connected to the pressure responsive means so that the port opening is varied in accordance with the temperature difference between the pan and the boiler.

7. In an apparatus as described, the combination comprising a vacuum pan, heating means in said pan, a condenser connected to said pan, a cold water supply connection to said pan, a fluid pressure operated motor valve in said connection, a material supply connection to said pan, a fluid pressure operated motor valve in said connection, means utilizing the vacuum in the pan acting through restricted passages to operate said motor valves including means forming ports for admitting atmospheric pressure to the motors of the valves, the port for the motor of the first valve being controlled by a device responsive to the absolute pressure in the pan, the port for the motor of the second valve being controlled by a device responsive to the supersaturation of the liquid in the pan, said valves, ports, and devices being interconnected so that a change in pan pressure will tend directly to move the first valve in a direction to maintain constant pressure in the pan and the second valve in a direction to maintain constant supersaturation in the pan ahead of action by the pressure and supersaturation responsive devices.

RUDOLF BECK.
ROY C. SYLVANDER.